US005208962A

United States Patent [19]

Walker, Jr.

[11] Patent Number: 5,208,962

[45] Date of Patent: May 11, 1993

[54] METHOD AND APPARATUS FOR AFFIXING TAGS ON LUMBER

[75] Inventor: Allen R. Walker, Jr., Salem, Va.

[73] Assignee: Tag-Matic, Inc., Salem, Va.

[21] Appl. No.: 831,056

[22] Filed: Feb. 4, 1992

[51] Int. Cl.[5] .............................................. B23P 11/00

[52] U.S. Cl. ........................................ 29/432; 29/716; 29/798; 227/7; 227/100; 198/340; 144/3 N

[58] Field of Search ................. 29/432, 709, 714, 716, 29/786, 787, 798, 407; 227/6, 7, 114, 117, 99, 100; 198/340, 406, 416; 193/DIG. 2; 144/3 N, 358; 493/375, 384; 364/474.09

[56] References Cited

U.S. PATENT DOCUMENTS

| | | | |
|---|---|---|---|
| 3,476,302 | 11/1969 | Hurd | 227/46 |
| 3,681,842 | 8/1972 | Blakeslee | 29/716 X |
| 4,182,474 | 1/1980 | Sato | 227/99 |
| 4,224,731 | 9/1980 | Lingle | 29/716 X |
| 4,235,161 | 11/1980 | Kunreuther | 493/376 |
| 4,334,346 | 6/1982 | Jensen | 29/716 X |
| 4,392,204 | 7/1983 | Prim et al. | 364/478 |
| 4,852,029 | 7/1989 | Pope et al. | 364/474.01 |
| 4,887,219 | 12/1989 | Strauser | 364/474.09 |
| 5,014,896 | 5/1991 | Reitmeier et al. | 227/39 |

*Primary Examiner*—Mark Rosenbaum
*Assistant Examiner*—S. Thomas Hughes
*Attorney, Agent, or Firm*—Larson & Taylor

[57] ABSTRACT

A method and apparatus is provided for labelling individual pieces of lumber by stapling a tag on the end portion of the lumber. A totally automated system is provided whereby the pieces of lumber move on a conveyor and over a sensor which activates a stapler to secure a tag on the end of a piece of lumber. A roller is disposed adjacent the sensor so that, after a tag is secured to the end portion of a piece of lumber, the end portion of the piece of lumber is raised on the roller to reset the sensor for stapling a tag on the next piece of lumber on the conveyor. A tag or label dispenser apparatus is disposed immediately adjacent the stapler. A second sensor is set to activate the tag dispenser to deliver a tag for stapling on the end of a succeeding piece of lumber as soon as a tag has been stapled to the preceding piece of lumber.

9 Claims, 3 Drawing Sheets

METHOD AND APPARATUS FOR AFFIXING TAGS ON LUMBER

FIELD OF THE INVENTION

The present invention relates to a method and apparatus for affixing labels or tags on individual pieces of lumber.

BACKGROUND OF THE INVENTION

Heretofore, tags have been affixed to lumber by hand stapling tags to the lumber or utilizing pressure sensitive tags which are pressed onto the lumber. The Reitmeier patent U.S. Pat. No. 5,014,896 discloses a device which is designed to provide labels which are stapled onto the ends of lumber. A roll of labels are fed into the stapling machine. Portable staple machines are well known in the prior art and shown, for example, in the Heard patent U.S. Pat. No. 3,476,302. However, it is not possible to hand staple tags on lumber which are moving on a conveyor at the rate of one foot per second. In the case of 2×4 pieces of lumber, the end of each board has a length of 3½ inches and with the boards moving along the conveyor at the rate of one foot per second, it would necessarily require that a tag would be applied to the boards within 335 milliseconds. This is, of course, an impossible rate to achieve manually. Thus, it became necessary to provide a totally automated method and apparatus for applying tags to lumber.

SUMMARY OF THE INVENTION

The present invention provides a completely automated system to ensure that a tag is stapled to each piece of lumber passing along a conveyor belt. This is achieved by locating a sensor on one side of the conveyor with the sensor being activated when a piece of lumber passes over the sensor. A roll of tags together with a stapling machine are disposed immediately adjacent to the sensor. Thus, when a piece of lumber passes over the sensor, a tag is placed against the end of the lumber and a stapler is activated to staple the label onto the end of the piece of lumber. An elevated roller is disposed alongside the conveyor in such a position that as the piece of lumber passes off the sensor, the piece of lumber is raised onto the elevated roller so as to deactivate the sensor. The provision of the elevated roller enables the system to differentiate between pieces of lumber so that the sensor will be activated by the movement of each piece of lumber onto the sensor and the sensor will then be deactivated as each piece of lumber is moved up onto the elevated roller. There is provided an additional sensing device on the path of the roll of tags or tapes which will transmit a signal to drive the tape forwardly so that a tag is always positioned to be stapled to the end of each piece of lumber when the piece of lumber activates the stapler.

An object of the present invention is to provide an automated method and apparatus for stapling tags on individual pieces of lumber as the lumber is moved at high speed along the conveyor.

Another object of the present invention is to provide sensing devices to transmit signals to a labelling and stapling means together with a mechanism for raising each piece of lumber off the conveyor momentarily to deactivate the sensor so as to enable the sensor to respond to the passage of each individual piece of lumber.

Other objects of the present invention will become more readily apparent upon consideration of the following detailed specification in connection with the accompanying drawings wherein:

DETAILED DESCRIPTION OF A PREFERRED EMBODIMENT

Figure 1:
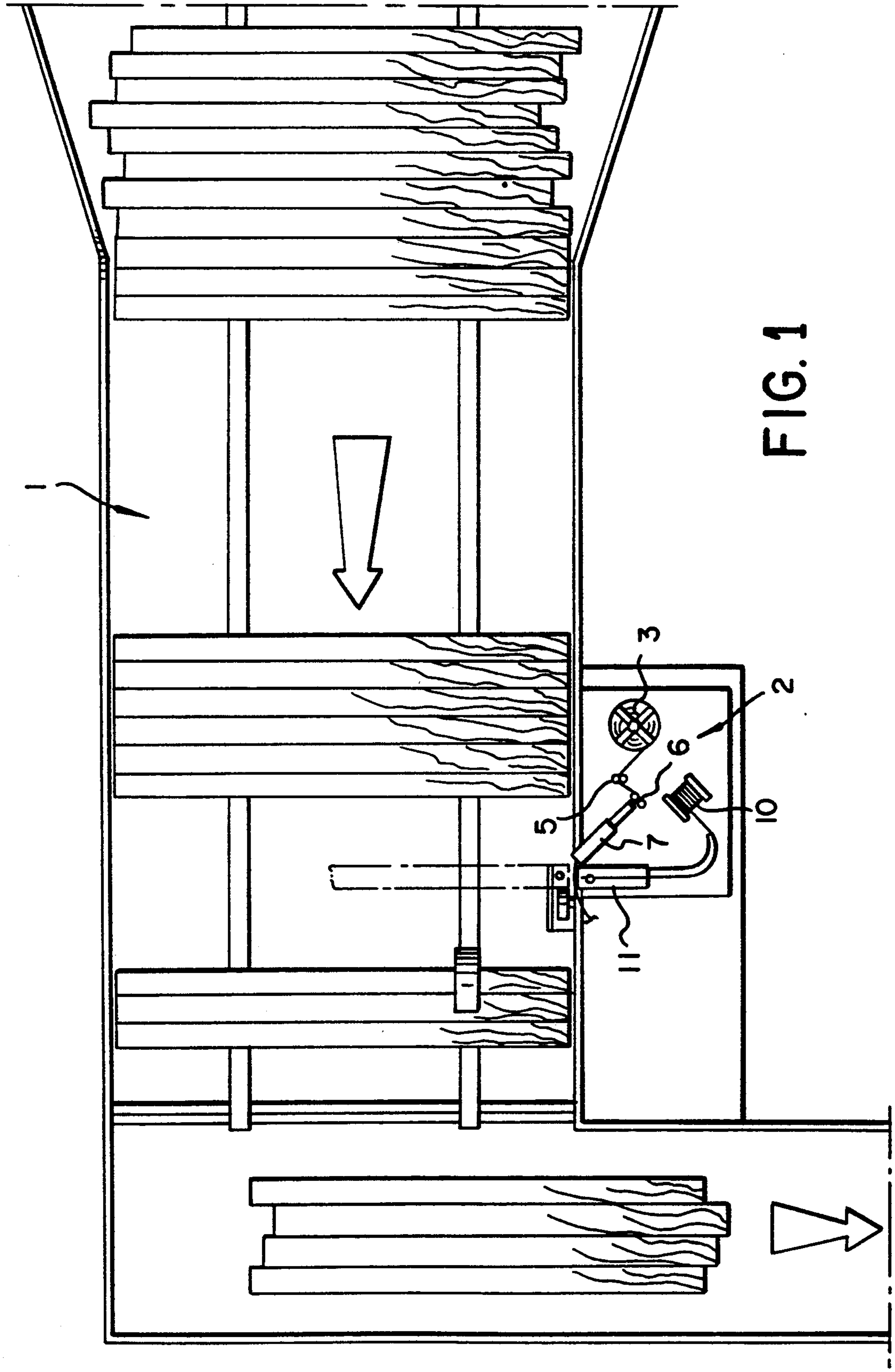
FIG. 1 is plan view of a conveyor and a labelling and stapling mechanism according to the present invention.

Referring now more specifically to the drawings wherein like numerals indicate like parts through the several views there is shown at 1 in FIG. 1 a conveyor for moving individual pieces of lumber through an automated tag applying mechanism a shown at 2 in FIG. 1. The boards move on the conveyor belt at a speed of approximately one foot per second so that the tagging mechanism must be extremely fast and accurate and capable of recognizing each individual board as it passes by the labelling and stapling mechanism.

There is provided a roll of labels or tags as shown at 3 in FIG. 1. This roll passes through pairs of rollers as shown at 5 and 6 in FIGS. 1 and 5 so as to move the tape through a passageway 7 to a set of knives 8 which cut the individual tags when the tag is in position for engagement with a piece of lumber.

There is further provided a reel of wire 10 which feeds wire to a stapling machine 11 having a stitching head 12 of conventional Stanley Bostich design. The stitching head 12 may be driven towards and away from the lumber by means of a power driven shaft 13. A sensing head 14 is provided on the front of the stitching head 12 which sense the proximity of the stitching head to the end of a piece of lumber to ensure that the stitching head never gets any closer to the end of the board than 19/32 seconds of an inch.

Figure 5:
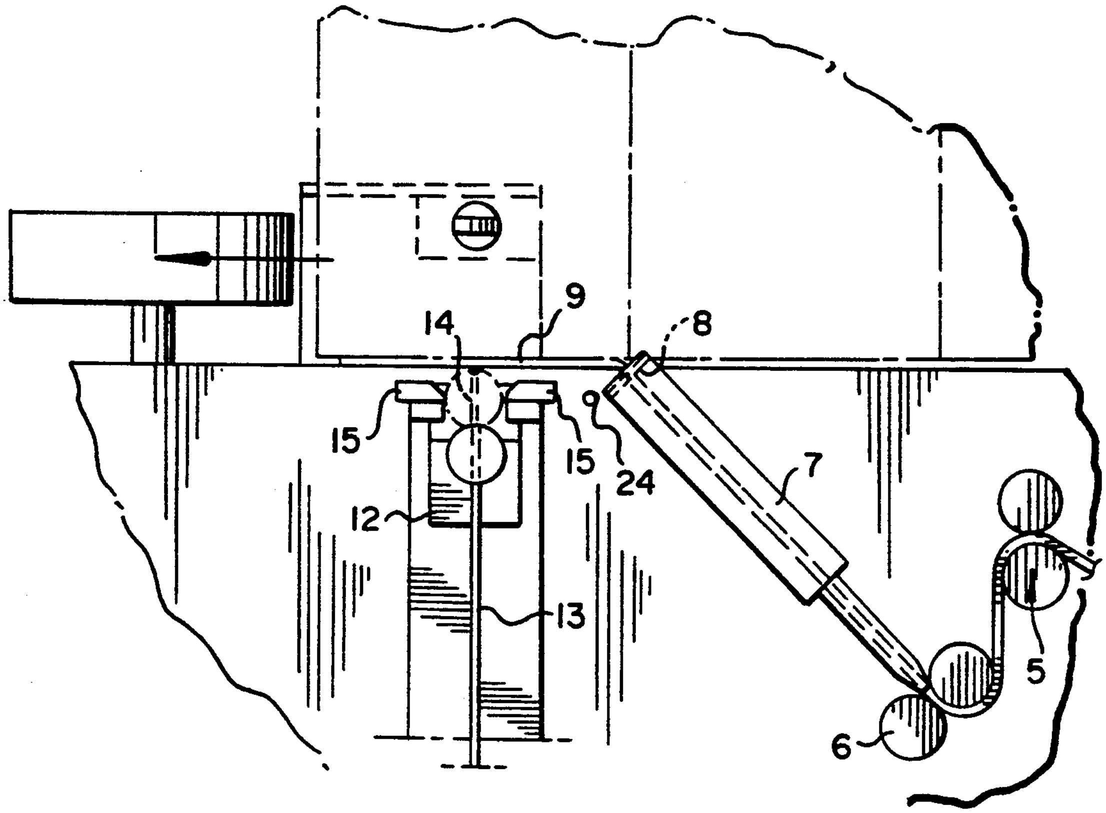
FIG. 5 shows a plan view of the labelling and stapling mechanism.
Figure 6:
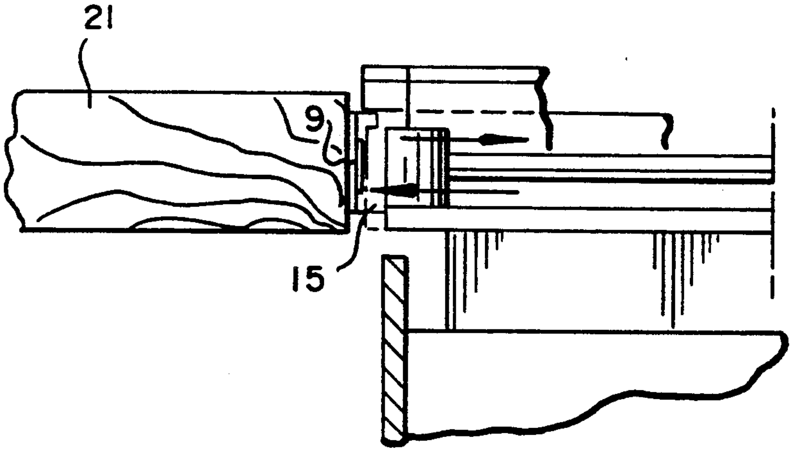
FIG. 6 shows a side elevation of the stapling mechanism.

As shown in FIG. 5, there is provided a pair of pads 15 which are spaced apart and are positioned to engage the tag 9 against the end of a piece of lumber to retain the tag in engagement with the piece of lumber during the stitching operation. The pads 15 are also shown in FIG. 6.

Figure 2:
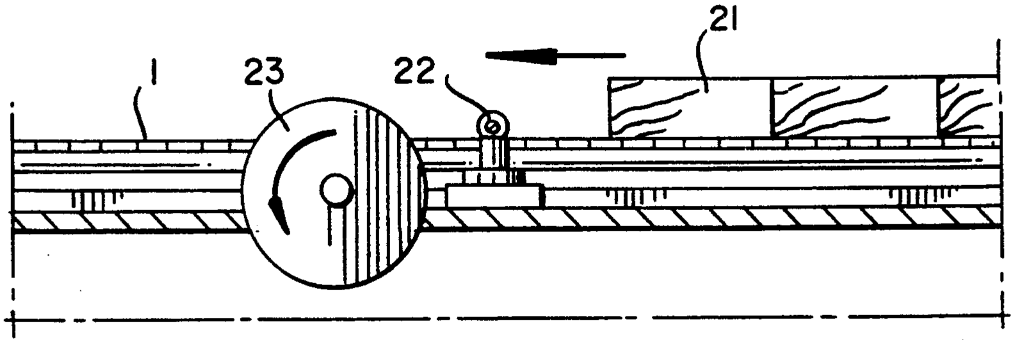
FIG. 2 is a sectional side elevation showing individual pieces of lumber approaching the sensing mechanism.
Figure 3:
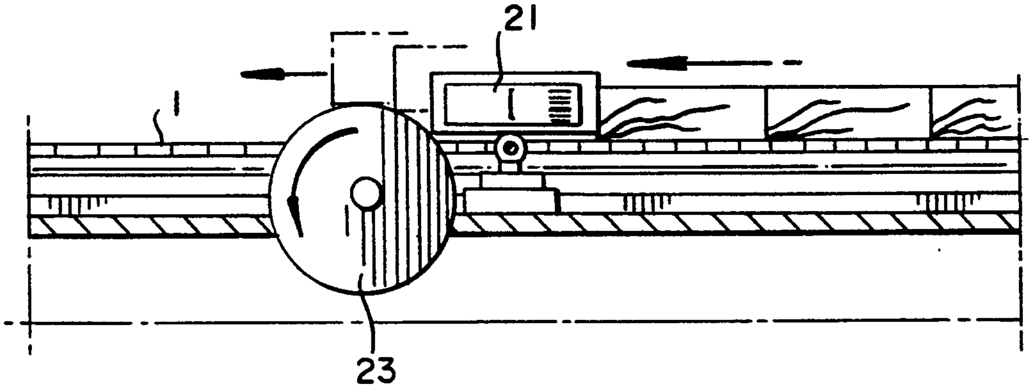
FIG. 3 is a side elevational view similar to FIG. 2 showing a piece of lumber passing over the sensor and onto the elevated roller.
Figure 4:
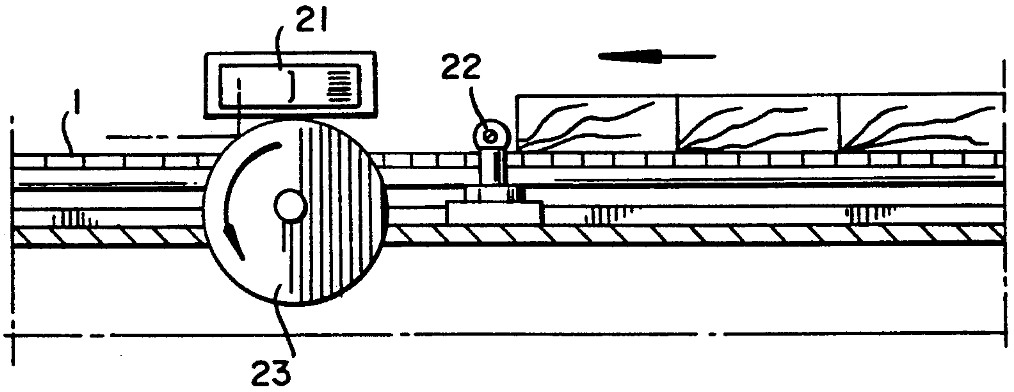
FIG. 4 is a view similar to FIG. 3 showing the piece of lumber reaching the top of the elevated roller and a succeeding piece of lumber about to activate the sensor.

In operation, a piece of lumber 21 as shown in FIG. 2 is moved along the conveyor and when the piece of lumber engages sensor 22, the sensor is depressed to activate the automated labelling system. The label or tag 9 is disposed adjacent the end piece of the lumber 21 and the stitching head is moved forward so that the pads 15 retain the tag 9 in position against the end of the board and staples are fired by the stapling machine head into the tag 9 and board 21 to firmly affix the tag to the end of the board as the board 21 moves across the sensing device 22. As seen in FIG. 3, the board 21 moves along the conveyor and reaches a rotatable roller 23 which lifts on end of the board 21 off the conveyor so as to release the depressed sensor 22. By lifting the board 21 off the end of the conveyor to deactivate sensor 22, enables the system to distinguish between individual boards even when the boards are immediately adjacent to each other. When the sensor 22 is deactivated, a signal is transmitted to the feed rollers 5 and 6 which feed tags through the guide system until the sensor 24, (FIG. 5), adjacent the end of the guide system senses a tag in position for attachment to a subsequent piece of lumber.

The presently disclosed invention provides a method and apparatus for securing tags to individual pieces of lumber at a very high rate of speed. A five pound roll of wire on reel 10 holds enough wire to form 42,000 staples. The roll of tags 3 provide sufficient tags to label 2500 pieces of lumber. Thus, the system may operate continuously for a day without the need to reload the wire or roll of tags.

Obviously many modifications and variations of the present invention are possible in light of the above teachings.

What is claimed as new and is desired to be secured by Letters Patent is:

1. A method for securing tags on lumber comprising the steps of moving a plurality of individual pieces of lumber along a conveyor, activating a sensor switch as each individual piece of lumber approaches an elevated roller, stapling a tag on an end of one of the individual pieces of lumber while the sensor switch is activated and elevating the one individual piece of lumber on the roller, thereby resetting the sensor switch.

2. A method for securing tags on lumber according to claim 1 and including the step of moving a pad into engagement with the tag, thereby holding the tag in position on the end of the piece of lumber prior to stapling the tag onto the piece of lumber.

3. A method for securing tags on lumber according to claim 1 and further including the step of activating a sensor on a stapler when the one individual piece of lumber is positioned on the sensor switch, thereby moving the stapler into position to staple a tag onto the end of the one individual piece of lumber.

4. A method for securing tags on lumber according to claim 1 and including the further step of moving a tag from a roll of tags into position to be stapled onto the end of a subsequent individual piece of lumber in response to resetting of the sensor switch.

5. A device for securing tags onto lumber comprising a conveyor for moving a plurality of individual pieces of lumber therealong, sensor means disposed on the conveyor, said sensor means being activated by passage of an individual piece of lumber, roller means disposed adjacent said sensor means for elevating individual pieces of lumber after passage over said sensor means to deactivate said sensor means and tag means disposed adjacent said sensor means for affixing a tag on the end of each piece of lumber, said tag means being activated by said sensor means.

6. A device according to claim 5 and further including stapler means for stapling the tags onto the ends of individual pieces of lumber and additional sensor means for moving said stapler means into a fixed predetermined position with respect to the ends of individual pieces of lumber.

7. A device according to claim 5 and further including knife means for cutting individual tags from a roll of tags, said knife means being actuated by a signal from said sensor means.

8. A device according to claim 5 wherein said tag means includes stapling means for stapling the tags onto the end of individual pieces of lumber.

9. A device according to claim 8 and further including pad means movable into engagement with the end of each individual piece of lumber for retaining a tag in place on the end of each individual piece of lumber prior to stapling the tags onto the lumber.

* * * * *